(12) United States Patent
Huster et al.

(10) Patent No.: US 11,593,050 B2
(45) Date of Patent: Feb. 28, 2023

(54) PRINTING SYSTEM AND METHOD OF EASIER PRINTING WHEN INFORMATION PROCESSING APPARATUS ACQUIRES WORKFLOW FROM CLOUD SERVER TO IDENTIFY WHETHER THE INFORMATION PROCESSING APPARATUS CONNECTED TO INTERNAL NETWORK AT FIRST LOCATION OR SECOND LOCATION

(71) Applicant: CANON EUROPA N.V., Amstelveen (NL)

(72) Inventors: Karsten Huster, Hamburg (DE); Chris Tickler, Harpenden (GB); Lex-Jan Westra, Tegelseweg (NL)

(73) Assignee: CANON EUROPA N.V., Amstelveen (NL)

( * ) Notice: Subject to any disclaimer, the term of this patent is extended or adjusted under 35 U.S.C. 154(b) by 0 days.

(21) Appl. No.: 17/425,249

(22) PCT Filed: Jan. 23, 2020

(86) PCT No.: PCT/EP2020/051601
§ 371 (c)(1),
(2) Date: Jul. 22, 2021

(87) PCT Pub. No.: WO2020/152257
PCT Pub. Date: Jul. 30, 2020

(65) Prior Publication Data
US 2022/0091805 A1    Mar. 24, 2022

(30) Foreign Application Priority Data

Jan. 24, 2019 (GB) .................................. 1900987.7

(51) Int. Cl.
*G06F 3/12* (2006.01)
*H04N 1/44* (2006.01)

(52) U.S. Cl.
CPC .......... *G06F 3/1288* (2013.01); *G06F 3/1203* (2013.01); *G06F 3/1226* (2013.01);
(Continued)

(58) Field of Classification Search
None
See application file for complete search history.

(56) References Cited

U.S. PATENT DOCUMENTS

| 7,424,532 B1 | 9/2008 | Subbiah |
| 7,584,246 B2 * | 9/2009 | Yokokura ............... H04L 67/51 358/1.15 |

(Continued)

*Primary Examiner* — Haris Sabah
(74) *Attorney, Agent, or Firm* — Canon U.S.A., Inc. IP Division

(57) ABSTRACT

A printing system is provided including a printer server accessible over a first network at a first location and a cloud service accessible from both the first location and a second network at a second network. A user with a client computer moving between the first network and the second network can print using either the printer server, when the user is on the first network, or the cloud service, when the user is on the second network. The client computer is configured detect its location and receive configuration information from the cloud service. The configuration information changes the method used by the client computer to print depending upon the client computer's detected location.

11 Claims, 10 Drawing Sheets

(52) U.S. Cl.
CPC .......... *G06F 3/1236* (2013.01); *G06F 3/1286* (2013.01); *G06F 3/1238* (2013.01); *H04N 1/4406* (2013.01)

(56) References Cited

U.S. PATENT DOCUMENTS

| | | |
|---|---|---|
| 10,152,290 B1 | 12/2018 | Khalyapin et al. |
| 2012/0069385 A1 | 3/2012 | Von Hatten et al. |
| 2013/0222827 A1 | 8/2013 | Watanabe |
| 2015/0339561 A1* | 11/2015 | Takenaka .............. G06F 3/1222 358/1.14 |
| 2017/0090831 A1* | 3/2017 | Januszewski ......... G06F 3/1287 |
| 2017/0286036 A1* | 10/2017 | Wong .................... G06F 3/1285 |
| 2018/0095396 A1 | 4/2018 | Sun et al. |
| 2019/0196757 A1* | 6/2019 | Shigetomi ............. G06F 3/1232 |

\* cited by examiner

PRINTING SYSTEM AND METHOD OF EASIER PRINTING WHEN INFORMATION PROCESSING APPARATUS ACQUIRES WORKFLOW FROM CLOUD SERVER TO IDENTIFY WHETHER THE INFORMATION PROCESSING APPARATUS CONNECTED TO INTERNAL NETWORK AT FIRST LOCATION OR SECOND LOCATION

CROSS-REFERENCE TO RELATED APPLICATIONS

The application is the National Phase application of PCT Application No. PCT/EP2020/051601, filed on Jan. 23, 2020 and titled "A Printing System and a Method of Printing". This application claims the benefit under 35 U.S.C. § 119(a)-(d) of United Kingdom Patent Application No. 1900987.7, filed on Jan. 24, 2019 and titled "A Printing System and a Method of Printing". The above cited patent application is incorporated herein by reference in its entirety.

TECHNICAL FIELD OF THE INVENTION

The present invention relates to a printing system and a method of printing.

BACKGROUND OF THE INVENTION

In many companies and organizations, a printer is provided in the office, and printing of a document is available from a laptop computer via a network. More specifically, when a user instructs to execute printing of data ('print data') which has been created by, for example, a word processing application in a laptop computer, the print data is transmitted to the printer via a network, and printing is performed at the printer subsequently.

In relatively large companies and organizations, multiple printers may be installed. If multiple printers are available, a user can use a printer which is located closer to the user, which increases convenience of the user. Moreover, when one of the multiple printers is occupied by another user, the user can save his or her time by alternatively using the other printer.

Furthermore, it is known that multiple printers are managed using a print server. In such case, the print server may be installed within an internal network of the company or the organization. When printing is instructed by a user operating a laptop computer, the print data is transmitted from the laptop computer to the print server and spooled therein. Then, when printing is instructed by the user operating a desired printer, the spooled print data is transmitted from the print server to the desired printer, and printing is performed subsequently.

A more recent trend is to move services that have been provided by internal servers to the cloud. It is also known that, in mid-sized companies and organizations that are provided with multiple printers, but which do not want to install their own print server within the internal network, printing is performed by using a cloud service accessible over the internet. Such cloud service could be provided by a third-party provider. In such case, when printing is instructed by a user operating a laptop computer, only attribute information of the print data spooled as a print job is transmitted from the laptop computer to the cloud service and the print data itself is spooled within the laptop computer. Then, when printing is instructed by a user operating a desired printer, the print data is transmitted from the laptop computer to the desired printer, and printing is performed subsequently.

In the case that a company or an organization has a HQ (headquarters) office and a branch office, it may be desirable that printing at the HQ office may be performed by using a print server installed within the HQ internal network, whereas printing at the branch office may be performed by using a cloud service. In the HQ office, print volume is likely to be large, thus it is worth having its own print server. On the other hand, in the branch office, print volume is not likely to be as large as the HQ office, thus it is not worth having its own print server. There are many other reasons that it may be desirable to use a local (internal) print server in one location and a cloud (external) service to service print needs in another location such as security requirements for data being printed.

However, some trouble may arise when a cloud service is used in one location and a local print server is used in another location. In particular, it may be difficult for users moving between the two locations to print without having to perform manual changes in the configuration of their laptop or other computer for printing or a manual change to switch between different pieces of printing software.

SUMMARY OF THE INVENTION

It is an aim of the present invention to allow easier printing when an information processing apparatus is moved between a first location in which printing is to be performed using a print server on an internal network and a second location in which printing is to be performed using a cloud service.

Aspects of the present invention are set out by the independent claims.

BRIEF DESCRIPTION OF THE DRAWINGS

Embodiments of the present invention will now be described, by way of example only, with reference to the accompanying drawings in which.

DETAILED DESCRIPTION OF THE INVENTION

Various illustrative embodiments, features, and aspects of the invention will be described in detail below with reference to the drawings. Configurations according to the illustrative embodiments of the present invention, which will be described below, are merely an example, and the present invention is not limited to these configurations.

Figure 1:
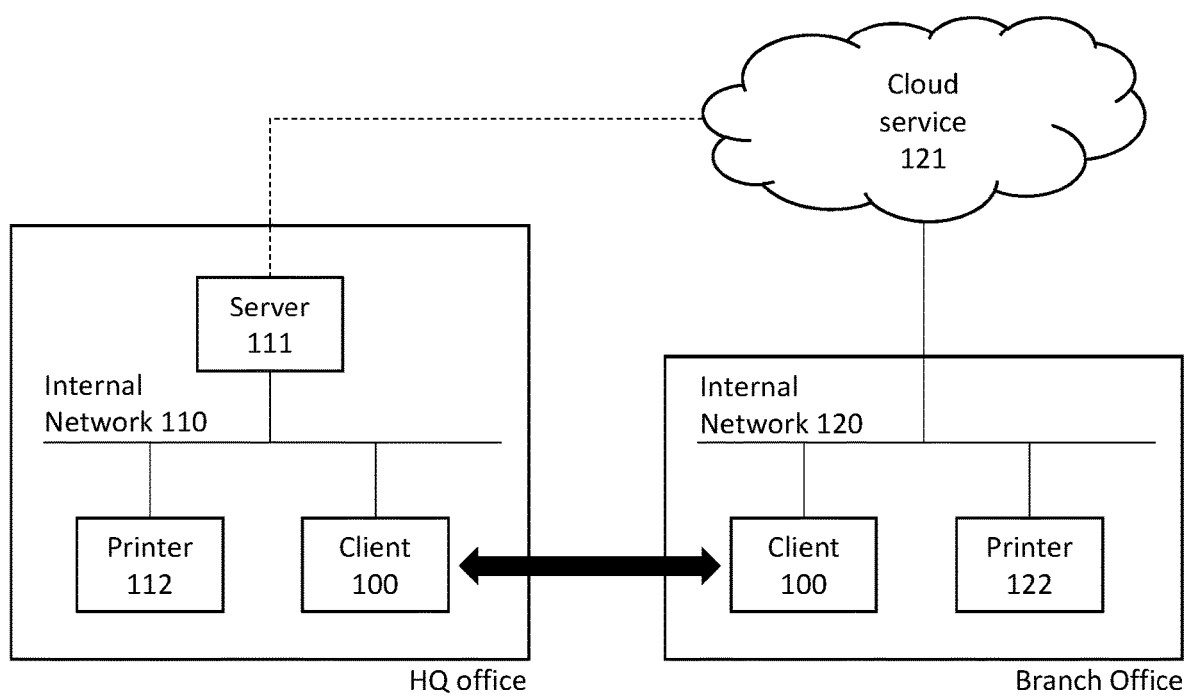
FIG. 1 illustrates an example of a printing system.

FIG. 1 illustrates a printing system including two geographical locations. The first location is a Head Quarters (HQ) Office of an organization. The second location is a Branch Office (BO) of the organization. In this embodiment, a HQ office and a branch office are described as an example. However, the invention is not limited to the combination of a HQ office and a branch office, any two locations using different printing methods (as explained in more detail below) would suffice. It could be two branch offices that have separate internal networks, and alternatively it could be two divisions or departments that are located in the same office but use a separate internal network.

In the HQ office there is a print server 111 and a printer 112 connected to each other via an HQ internal network 110. A client computer 100 can also be connected to the HQ internal network 110, and it can communicate with the print server 111 and the printer 112 via the HQ internal network 110.

In the branch office, there is a printer 122 connected to a Branch office (BO) internal network 120. The client computer 100 can also be connected to the BO internal network 120, and it can communicate with the printer 122 via the BO internal network 120. The arrow in FIG. 1 between the HQ office and the branch office shows that the client computer 100 can be carried between those offices, thereby moving between HQ internal network 110 and the BO internal network 120. In other words, if it is owned by an employee who routinely works in the HQ office, the employee can take the client computer 100 with him or her when he or she visits the branch office and connect it to the BO internal network 120. Likewise, if it is owned by an employee who routinely works in the branch office, the employee can take the client computer 100 with him or her when he or she visits the HQ office and connect it to the HQ internal network 110.

The client computer 100 and the Printer 122 can also communicate with the cloud service 121. The BO internal network 120 is connected to the internet via a router (not shown). The internal networks 110 and 120 can be a wired or wireless network. It can be called simply "network", or alternatively called "LAN" (Local Area Network).

Furthermore, as will be described in more detail below, the print server 111 and cloud service 121 communicate with each other to exchange information. This can be done via the internet.

Figure 2:
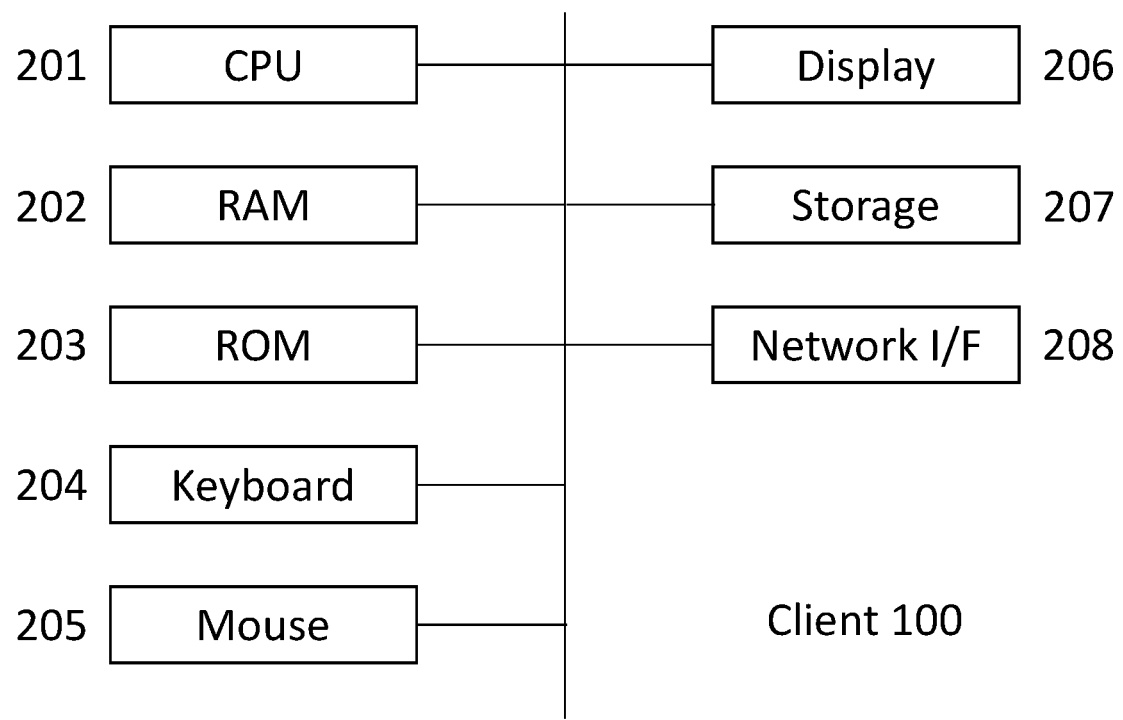
FIG. 2 illustrates an example of hardware configuration of an information processing apparatus.

FIG. 2 shows selected standard components that are present in the client computer 100. The client computer 100 is an example of the information processing apparatus, and in this embodiment, it is a general-use laptop computer. The client computer 100 has a CPU (Central Processing Unit) 201, a RAM (Random Access Memory) 202, a ROM (Read Only Memory) 203, a keyboard 204, a mouse 205, a display unit 206, an external storage device 207, and a network interface 208 which are all connected to each other via a bus.

The CPU 201 is a standard processor such as those available from Intel® or AMD®. The RAM 202 is a conventional RAM and is used as a temporary storage area for instructions being processed by the CPU 201. The ROM 203 is a memory that stores certain applications such as a document creation application for use by the client computer 100, such as the BIOS. The keyboard 204 and mouse 205 form input devices for the client computer 100 in a conventional manner. The display unit 206 is a TFT display for providing output display for a user. The external storage device 207 is a removable USB hard disk drive. Network interface 208 is a set of standard components that allows the client computer 100 to communicate over the internal network 110 or 120. Such client computers are well known in the art and may include additional components (video cards etc.) or other components.

Figure 3:
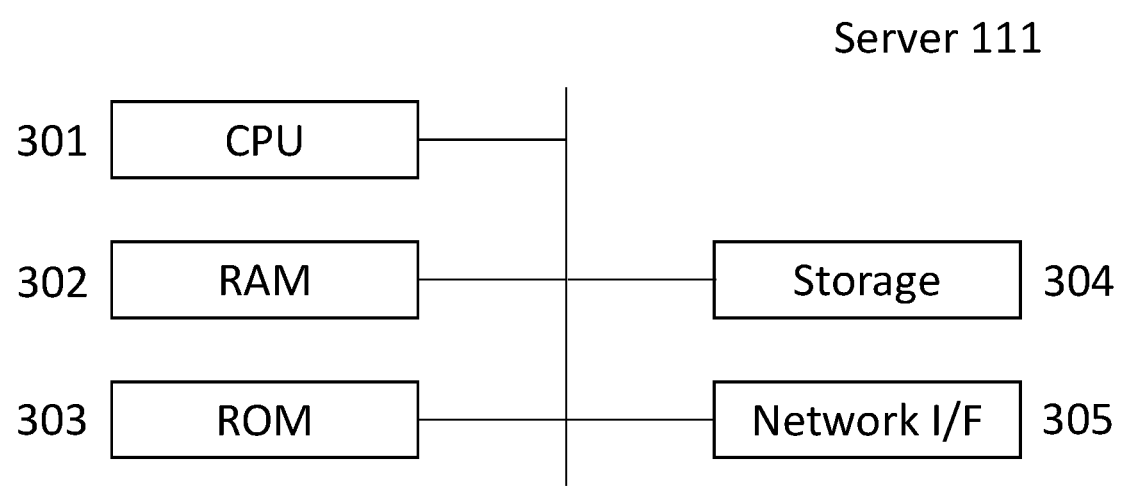
FIG. 3 illustrates an example of hardware configuration of a print server.

FIG. 3 shows selected standard components that are present in the print server 111. The print server 111 has a CPU 301, a RAM 302, a ROM 303, a storage 304, and a network interface 305 which are all connected each other via a bus. It is possible for those components of the print server 111 to be either distributed to multiple physical locations or integrated in a single housing.

The CPU 301 is a standard processor such as those available from Intel® or AMD®. The RAM 302 is a conventional RAM and is used as a temporary storage area for instructions being processed by the CPU 301. The ROM 303 is a memory that stores certain applications for use by the print server 111, such as the BIOS. The storage 304 is a hard disk drive. Network interface 305 is a set of standard components that allows the print server 111 to communicate over the internal network 110 or the Internet.

Figure 4:
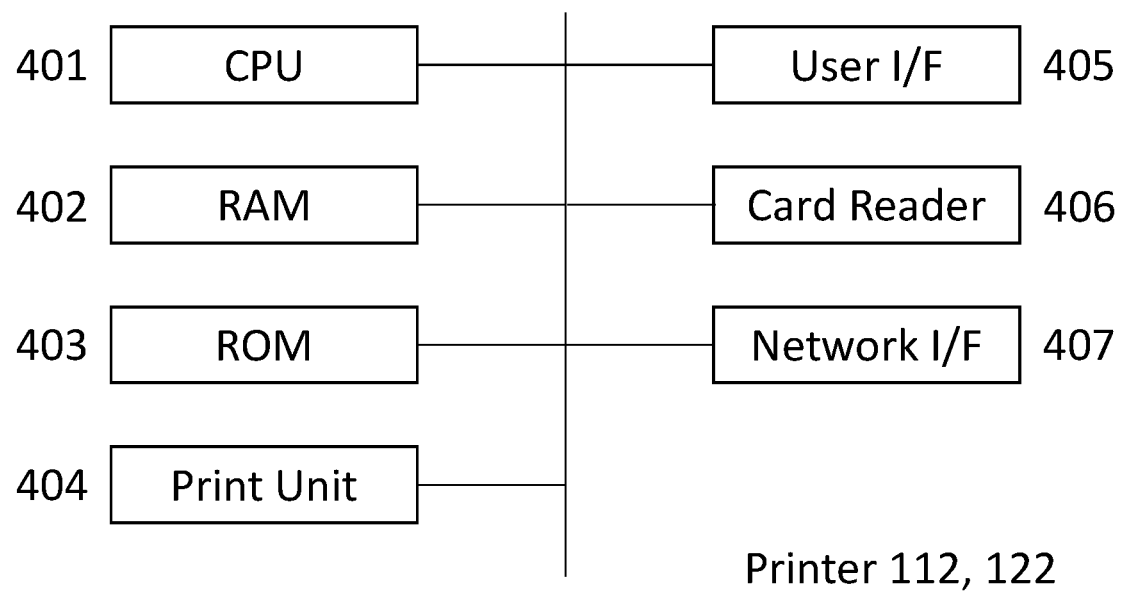
FIG. 4 illustrates an example of hardware configuration of printers.

FIG. 4 shows selected standard components that are present in the printers 112 and 122. The printers 112 and 122 have a CPU 401, a RAM 402, a ROM 403, a print unit 404, a user interface 405, a card reader 406, and a network interface 407 which are all connected to each other via a bus. The CPU 401 is a standard processor such as those available from Intel® or AMD®. The RAM 402 is a conventional RAM and is used as a temporary storage area for instructions being processed by the CPU 401. The ROM 403 is a memory that stores certain applications for use by the printers 112 and 122, such as the BIOS. The print unit 404 could be implemented by an electrophotographic type printer engine or an inkjet type printer engine, and it can print an image on a printing media such as a paper based on the provided data.

The card reader 406 reads out a user ID information from a contactless card. The readout ID is used to identify or authenticate the user who is operating the printers 112 and 122. The user ID can be input into the printers 112 and 122 by using a keyboard instead of the card reader 406. The authentication of the user can be done in cooperation with a separately-installed authentication server which is provided within each internal network. Network interface 407 is a set of standard components that allows the printers 112 and 122 to communicate over the internal network 110 or 120.

Figure 5:
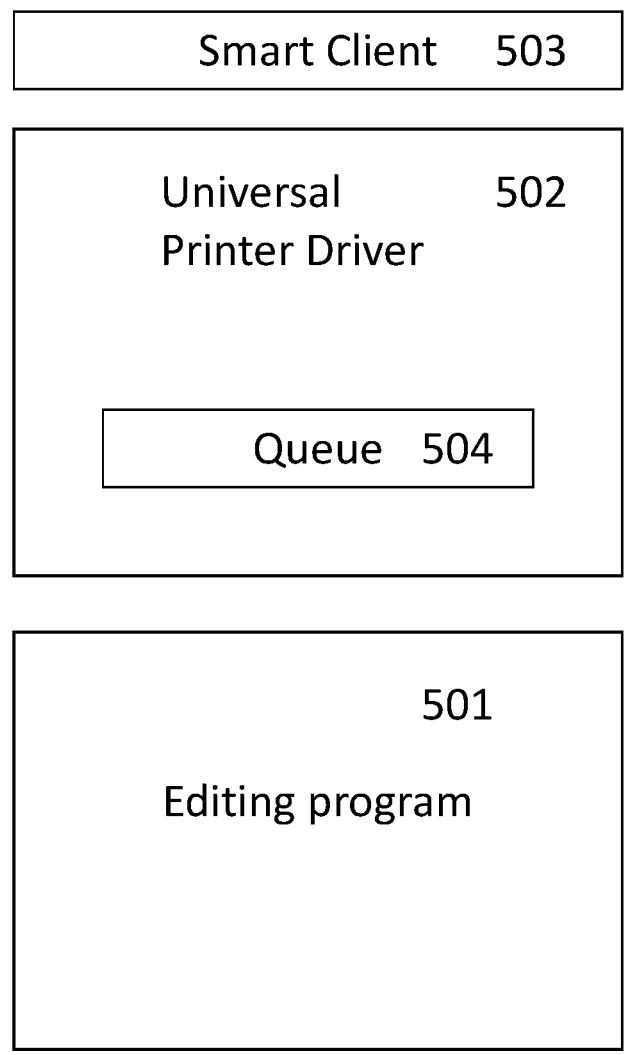
FIG. 5 shows software configuration on the information processing apparatus.

FIG. 5 shows software installed on the client computer 100. The client computer 100 includes normal computer software, such as an operating system (e.g. Windows® or Mac OS®), which aren't shown in the Figure. Additionally, the client computer 100 has an editing program 501, such as Microsoft Word® or a PDF editing program. The editing program is just an example program and any program from which it may be desired to print may be used. The client computer 100 further includes a printer driver 502, referred to as a Universal printer driver. The printer driver 502 is configured to convert data for printing, such as output from the editing program 501 via the operating system spooling functions, into a single printer language. In this example, the printer driver 502 is configured to convert print data of a print job into the PCL printer language (Printer Command Language). However, another printer language may be used. The printer language used by the printer driver 502 does not vary according to the printer type to which the print data is to be sent, despite different models of printer using different printer languages. The Universal Printer driver includes a queue 504 for spooled jobs waiting to be printed.

The client computer 100 further has installed on it a program 503, which will be referred to as a 'smart client'. The smart client 503 can take over typical print server tasks such as print job spooling, storage of attribute information of the print jobs and provision of print job lists to a printer. As will be explained in more detail later, the smart client 503 is configured to control the printing behavior of the client computer 100.

Figure 6:
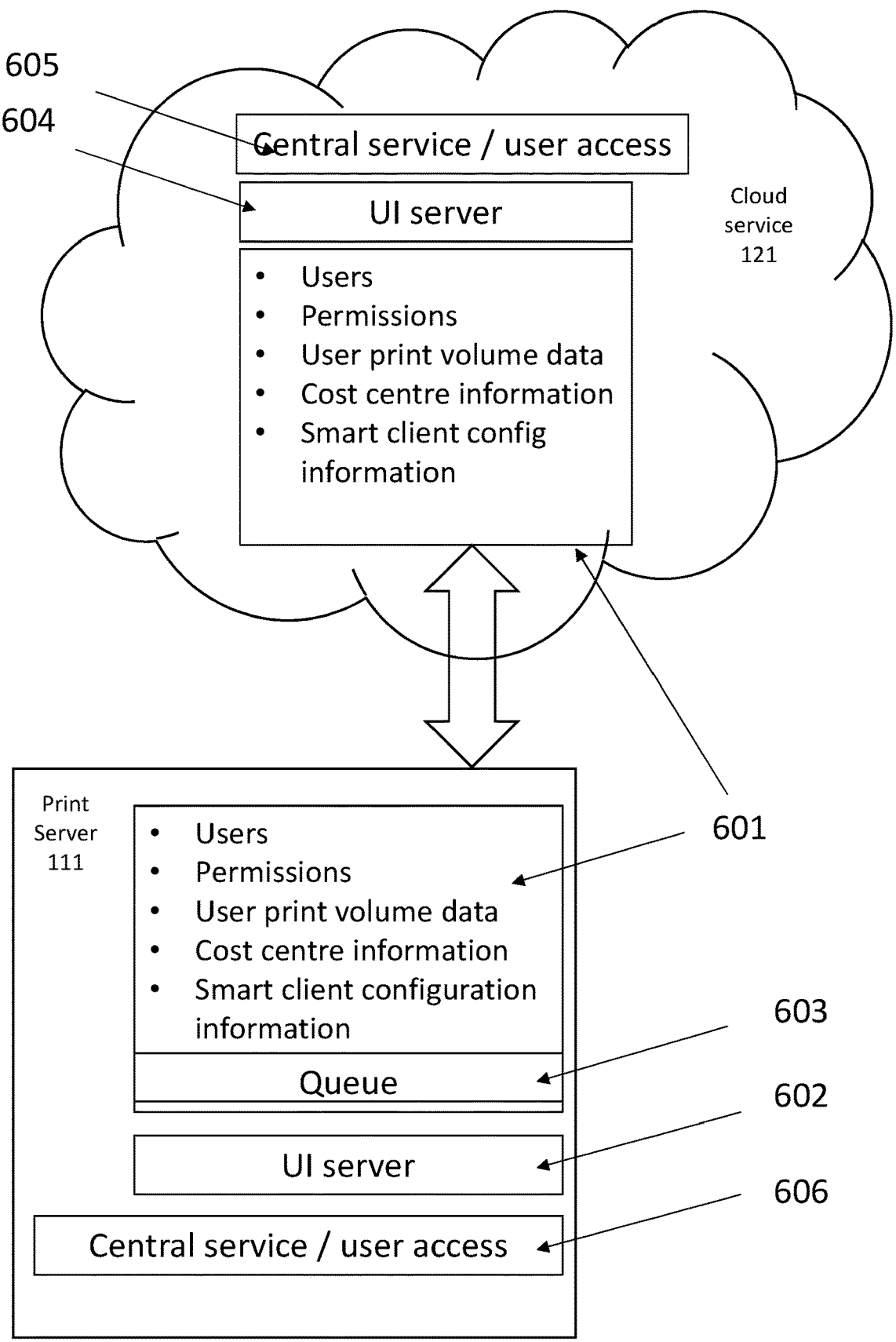
FIG. 6 illustrates communication between the print server and a cloud service.

FIG. 6 illustrates communication between the cloud service 121 and the print server 111. As mentioned previously, there is an exchange of information 601 between the cloud service 121 and the print server 111. In particular, at the time when the print server 111 is being set up in the HQ office, the print server 111 is configured with a connection to the cloud service 121. The print server 111 is registered with the cloud service 121 with a user account (e.g. XYZ corporation). Thereafter, the information 601 is periodically synchronized between the print server 111 and the cloud service 121.

FIG. 6 illustrates information 601 that is synchronized between the print server 111 and the cloud service 121. The information 601 includes the identities of registered users of the print system illustrated in FIG. 1. The idea of registered users in a print system is known in the printing field and consists of those users who are registered within an authentication function of the print system. The registered users may have differing authorizations, e.g. permission to print, scan or perform other operations within the print system. Not all users may have the same permissions.

The user identities and permissions are also shared/synchronized between the cloud service 121 and the print server 111. As a consequence, a registered user may log in to each of the cloud service 121 and the print server 111. Further, changes made by an administrator to permissions or to add/remove registered users are kept up-to-date in the cloud service 121 and print server 111 by virtue of this synchronization. The synchronization may be performed according to a determined schedule, upon detection of a change in the data at either the cloud service 121 or the print server 111, or by any other method.

In addition to the identity of the registered users, permissions of the users (e.g. print permissions such as printing single/duplex or the ability to print color/black and white), information about the print history of the user (e.g. volumes printed by the user etc.) and cost centre information (cost centre information allocated by a user against certain print or scan activities) may be synchronized between the print server 111 and the cloud service 121.

FIG. 6 shows a central service and user access function 605 on the cloud service 121 and a central service and user access function 606 on the print server 111 (each shown in a single central service/user access block for illustrative convenience). As will be explained in more detail in connection with FIG. 8, the central service of the cloud service 121 and the central service of the print server 111 are configured to provide configuration information to the smart client 503 of the client computer 100. The user access function includes a database storing the identity of the registered users and print permissions mentioned above. When a request is received from a client computer 100 to access the cloud service 121, the user access function 605 checks the received user name and password or other authentication information such as a token against the database of registered users and only allows access to further functions of the cloud service 121 if the user name and authentication match a registered user. Similarly, the user access function 606 of the print server 111 checks a received user name and password or other authentication information such as a token against the database of registered users and only allows access to further functions of the print server 111 if the user name and authentication match a registered user. As shown in FIG. 6, the smart client configuration information is synchronized between the print server 111 and the cloud service 121.

FIG. 6 further shows two additional features of the print server 111. The first is UI server software 602, which is provided on the print server 111 to provide UI display screens to the printer 112 in the HQ office as will be explained in more detail below. The second is a print queue 603 for storing print jobs for printing.

The cloud service 121 also has a UI server function 604 and the printer 122 in the branch office is configured to be served UI pages from the cloud service 121.

Figure 7:
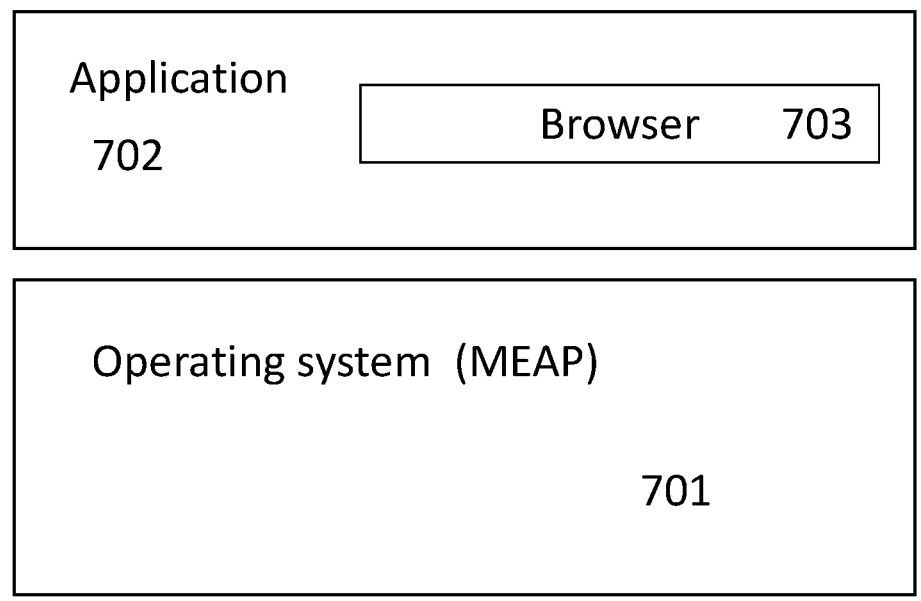
FIG. 7 shows software configuration on a printer.

FIG. 7 shows software on the printers 112 and 122. In the example, the printers are Canon® Multi-function printers. However, in other example, the printers may be from another manufacturer or be a single function or other type of printer. The Multi-function printers 112 and 122 each have a Java®-based operating system 701 installed on them. On the operating system 701 it is possible to install software applications 702. In the present embodiments that multi-function printers at least have a single UI application 702 installed on them. This UI application includes a browser 703 and functions to allow the Multi-function printer to connect to the UI server 602 of the print server 111 or the UI server 604 of the cloud service 121, to be served UI display pages. In this way, the UI of each printer in the HQ office is sent pages/data by the print server 111 and each printer in the Branch office is sent pages/data by the cloud service 121. The printers in the HQ office can display print jobs stored on the print queue 603 of the print server 111 and the user can release jobs to the printer for printing.

Figure 8:
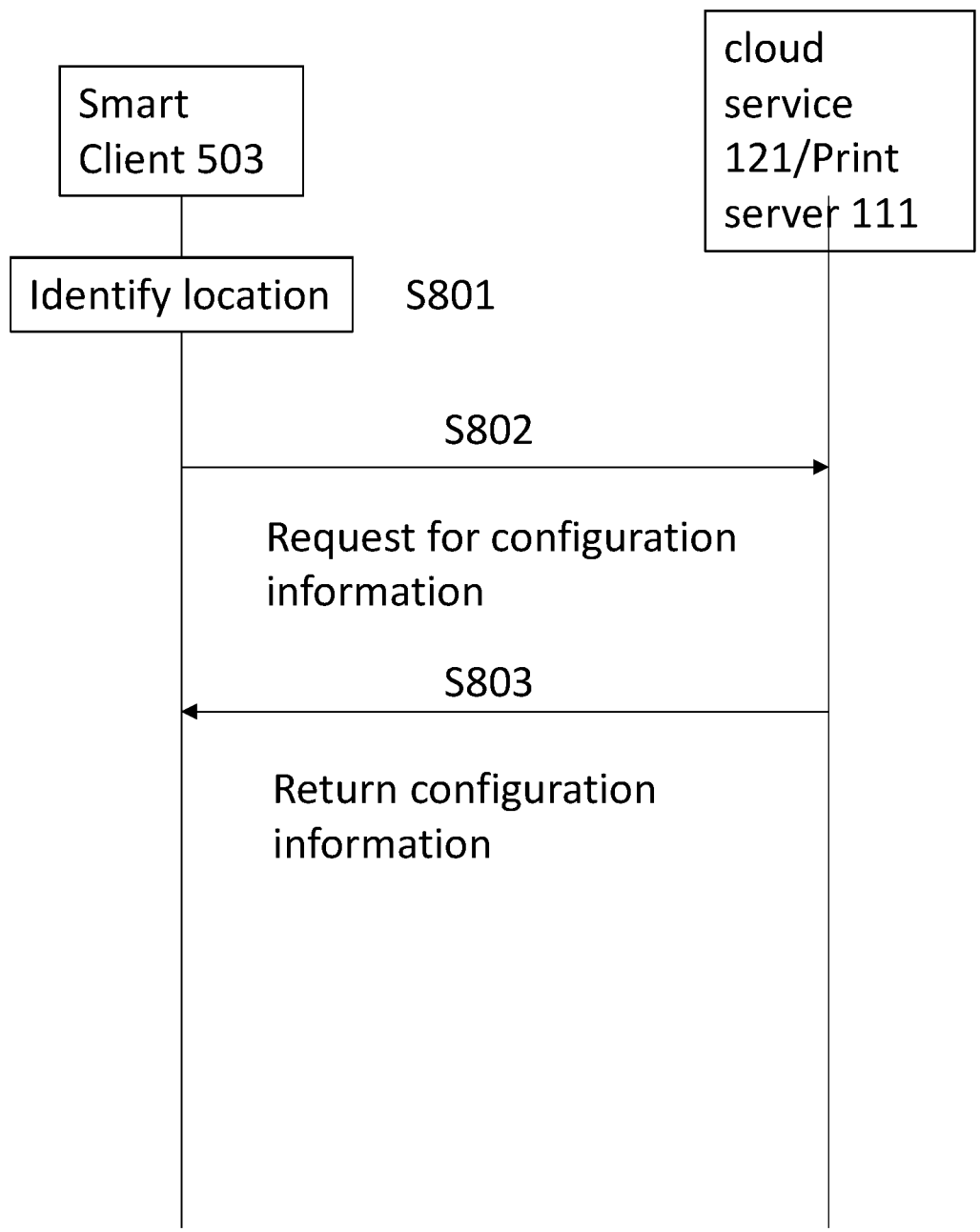
FIG. 8 illustrates a communication sequence between the information processing apparatus and one of the cloud service and the print server.

FIG. 8 shows operations between the smart client 503 installed on the client computer 100 and either the cloud service 121 or print server 111. The following FIGS. 9 and 10 will explain two different print work flows that can be controlled by the smart client 503 in dependence upon this communication between the smart client 503 and either the print server 111 or the cloud service 121.

As mentioned earlier, the purpose of the smart client 503 is to take on some functions of a print server. In particular, the smart client 503 is configured to look for configuration information from a central service, in this case the central service 605 on cloud service 121 or the central service 606 on the print server 111. The client computer 100 is initially configured and issued to a user within the HQ office. The smart client 503 is initially configured to communicate with the both the central service 606 on the print server 111 and the central service 605 of the cloud service 121. That is to say that suitable address information is stored within the smart client 503 to allow the smart client 503 to connect to the central service 606 of the print server 111 and the central service 605 of the cloud service 121. The smart client 503 is configured with the address of the central service 605 of the cloud service 121 as a higher priority than the central service 606 of the print server 111, such that the smart client 503 will try to connect to the central service of the cloud server first before trying to connect to the central service 606 of the print server 111 if connection to the cloud service 121 is not possible.

When the smart client 503 starts (when it is activated), the smart client 503 detects the location the client computer 100 at S801. There are several ways to identify the location of a client computer. For example, it may be possible to identify the location of the client computer by the IP address allocated to the client computer. Another method is to look at the DNS tracking. Another option is trace routing.

In the case that the IP address is used for the identification, if the IP address allocated to the client computer 100 is within the IP address range for the HQ internal network 110, the location of the client computer 100 is identified as being at the HQ, and similarly if the IP address allocated to the client computer 100 is within the IP address range for the BO internal network 120, the location of the client computer 100 is identified as being at the BO. Alternatively, in the case that DNS is used for the identification, if the domain is 'XYZ.de', the location of the client computer 100 is identified as being in Germany, and similarly if the domain is 'XYZ.com', the location of the client computer 100 is identified as being in the United States.

In the case of trace routing, a command is sent to a known address, such as a company web server or domain controller using a traceroute or similar diagnostic tool that generates a list of routers that the packet passes through on its way to the destination. In this way, by looking at the information of the nearest (shortest time) routers information about the location of the smart client can be obtained.

When the smart client 503 is required, the smart client 503 sends a request for configuration information to a central service 605 or 606 at S802. The smart client 503 monitors a spooler, so if a job is being created by the printer driver 502, the smart client 503 will intercept it. The request for configuration information includes information about the network location of the client computer 100. As noted above, the central service 605 of the cloud service 121 is given a higher priority by the smart client 503. Accordingly, a request is first sent to the central service 605 of the cloud service 121. In a case that the client computer 100 is on the HQ internal network 110, the central service 605 will respond with configuration information to cause the client computer 100 to perform a workflow as will be subsequently described with reference to FIG. 9. In particular, the configuration information will cause the client computer 100 to send print data to the queue 603 on the print server 111. On the other hand, if the user is visiting the branch office, in reply to the request to the central service 605 of the cloud service 121, the central service 605 of the cloud service 121 will send configuration information to cause the client computer 100 to perform a print workflow as will be subsequently described with reference to FIG. 10. In particular, the configuration information will cause the printer driver 502 of the client computer 100 to store print data in the queue 504 of the printer driver 502. In a case where the request for configuration information transmitted by the client computer 100 while residing on the HQ office internal network 110 is not replied to, the client computer 100 will secondly try the central service 606 on the print server 111. In a case where the request for configuration information transmitted by the client computer 100 while residing on the branch office internal network 120 is not replied to, the printing will fail because the central service 606 of the print server 111 is not accessible from the branch office internal network 120.

The skilled person will understand that the print work flows now described with reference to FIG. 9 and are illustrative and the print workflows at each location may be varied according to needs. The embodiments include a mechanism that allows a hybrid cloud printing system, whereby a client computer can automatically be configured to execute printing using the print server 111 in the HQ office location and printing using the cloud service 121 in the Branch office location. This is achieved by automatically configuring the smart client 503 as the client computer 100 moves between the two locations.

Figure 9:
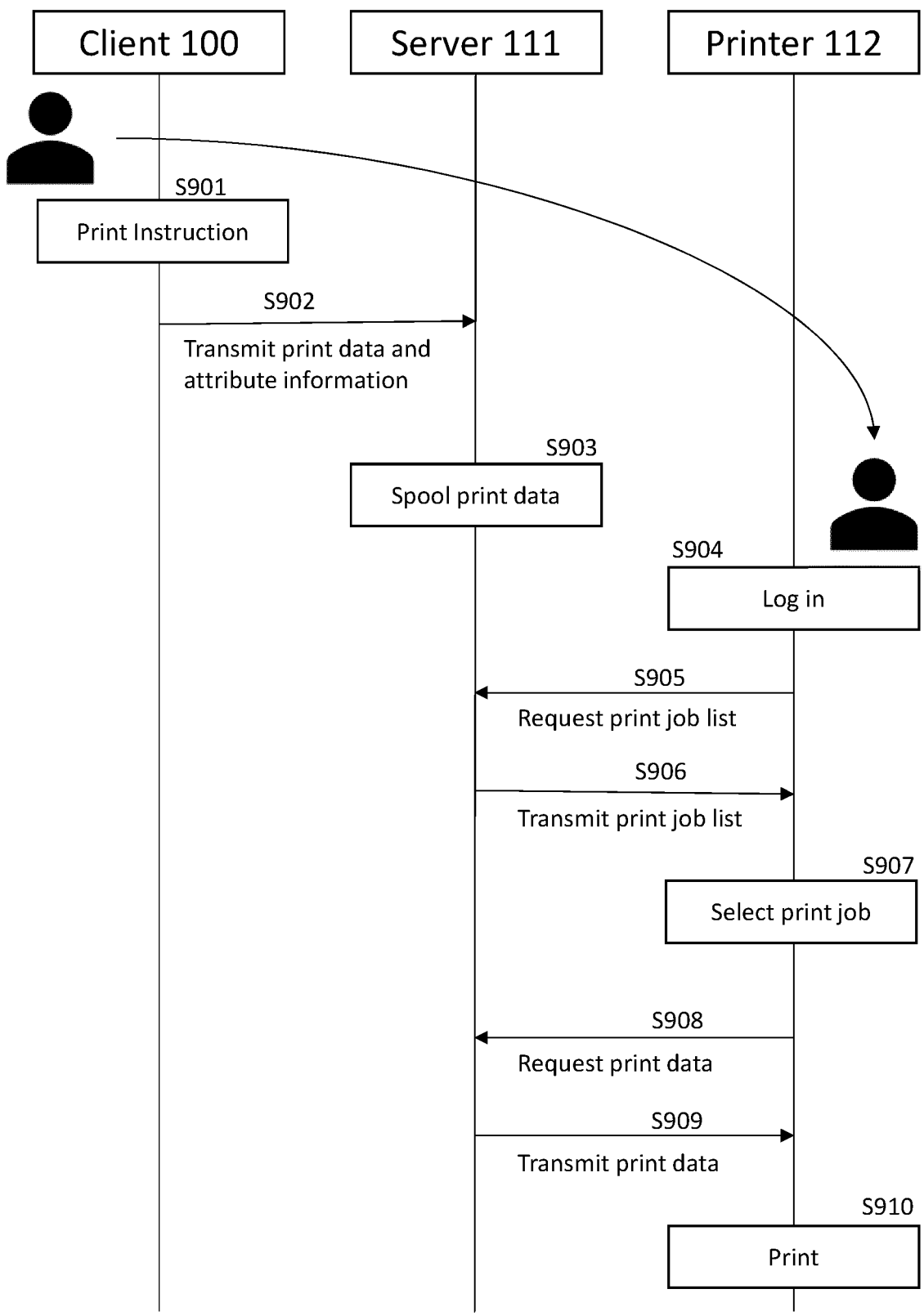
FIG. 9 is a sequence diagram illustrating a printing method when a print server is utilized.

FIG. 9 shows a sequence diagram illustrating a printing method at the HQ office where the print server 111 is utilized. In this case, the smart client 503 has received configuration information that indicates that the print job including the print data should be sent by the printer driver 502 to the Queue 603 on the print server 111 for printing. In S901, the user operating the client computer 100 instructs to print data that is stored in the client computer 100. This instruction can be issued by the editing program 501 installed in the client computer 100. As noted above, this application includes but is not limited to a word processing application, a spreadsheet software, and a web browser, and the printer driver 502 is activated by those applications via the operating system of the client computer 100.

In S902, the client computer 100 sends an access request to the print server 111. The access request includes user identification and authentication information which is processed by the user access function 606 of the print server 111. The user access function 606 checks the received identification and authentication information against the information stored in the synchronized database of the user access function 606. If the information corresponds to that of a registered user, the access request is successful.

If the user access request is successful, both print data and attribute information of the print data are transmitted from the client computer 100 to the print server 111. The transmission of the print data and the attribute information can be done either in a batch or separately. The transmitted print data is then spooled as a print job and stored in the queue 603 on the print server 111 in S903. The attribute information includes information such as the identity of the user who requested the printing and information about print settings, such as number of copies, black and white or color, stapling options etc.

The user who operated the client computer 100 then moves to the location where the printer 112 is located, and logs into the printer 112 for example by using the contactless card in S904. This involves a request by the printer 112 to the user access function 606, which request includes user name and authentication information from the contactless card.

Once the user has successfully logged into the printer 112 (i.e. the authentication of the user was successful), the user is allowed to use functions of the printer 112. "printing" is one of those functions, and when the user selects "printing", the printer 112 requests the print server 111 for a list of print jobs stored in the queue 603 and belonging to the logged in user in S905. This list contains the names of print jobs having attribute information indicating that the print server 111 received the print job from the user.

In S906, the requested list is transmitted from the print server 111 to the printer 112. In S907, the list provided by the print server 111 is displayed at the operation screen included in the user interface 405. The names of print jobs are displayed on the user I/F 405 of the printer so that the user can easily select a print job which he or she wishes to print at the printer 112.

In 907, the user selects a print job, and in S908, the printer 112 sends a request to the print server 111 for the print data corresponding to the selected print job. In S909, the requested print data is transmitted from the print server 111 to the printer 112. Step S909 also includes converting, by the print server 112, the print data from the generic PCL file format in which it was sent to the queue 603 by the universal print driver 502 into a print language that is accepted by the printer 112. This conversion is done by means of device information files (DIF files) stored on the print server 111. In S910, printing is performed at the printer 112 based on the print data received from the print server 111.

Figure 10:
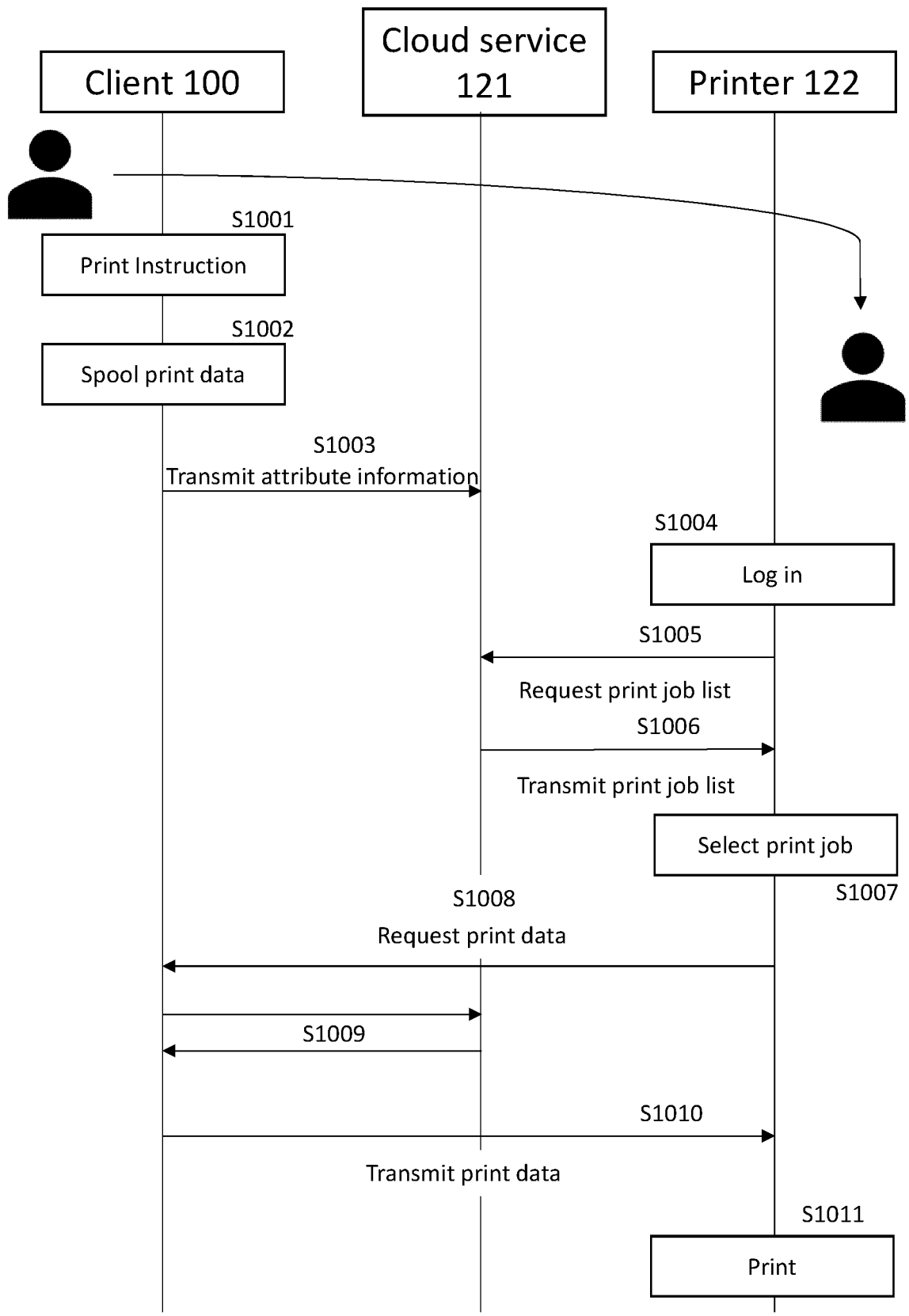
FIG. 10 is a sequence diagram illustrating a printing method when a cloud server is utilized.

FIG. 10 shows a sequence diagram illustrating a printing method at the branch office where the cloud service 121 is utilized. In this situation, the smart client 503 on the client computer 100 attempted to contact the central service 605 of the cloud service 121 and received configuration information from there. The configuration information from the central service 605 of the cloud service 121 indicates that, based on the client computer's location on the BO internal network 120, the print workflow is for the universal printer driver 502 to store the print job on the queue 504 of the client computer 100. The configuration information also indicates that the smart client 503 is therefore to perform the print server functions, such as performing print job conversion as will be explained in more detail below.

In S1001, the user operating the client computer 100 instructs to print data that is stored in the client computer 100. This instruction can be issued by the editing program 501 installed in the client computer 100 in cooperation with the operating system installed in the client computer 100.

In S1002, print data is spooled in the client computer 100 and stored in the queue 504. Further, in S1003 the client computer 100 sends an access request to the cloud service 121. The access request includes user identification and authentication information which is processed by the user access function 605 of the cloud service 121. The user access function 605 checks the received identification and authentication information against the information stored in the synchronized database of the user access function 605. If the information corresponds to that of a registered user, the access request is successful. If the user access request is successful, the client computer 110 sends a request to register a print job. The request includes only attribute information (metadata about the print job). The information about the content to be printed (print data) is not transmitted to the cloud service 121.

The user who operated the client computer 100 then moves to the location where the printer 122 is located, and logs into the printer 122 by using the contactless card in S1004. The log in process involves the printer sending a user access request to the user access function 605 of the cloud service 121 including login information retrieved from the user's contactless card. If the login information matches a registered user in the database of the user access function of the cloud service 121, the login is successful.

Once the user has successfully logged into the printer 122 (i.e. the authentication of the user was successful), the user is allowed to use functions of the printer 122. "printing" is one of those functions, and when the user selects "printing", the printer 122 sends a request to the cloud service 121 for a list of print jobs in S1005. The UI server 604 of the cloud service 121 serves a UI page including the list of print jobs who's attribute information has been sent to the cloud service 121 and matching the identity of the user that logged in to the printer 122.

In S1006, the requested list is transmitted from the cloud service 121 to the printer 122. In S1007, the list provided by the cloud service 121 is displayed at the operation screen included in the user interface 405. The names of print jobs are displayed on the user I/F 405 of the printer 122 so that the user can easily select a print job which he or she wishes to print at the printer 122. In S1006, the cloud service 121 also provides the printer 122 with network address information of the client computer 100 that is storing the print data corresponding each job of the user.

In 1007, the user selects a print job for printing on the printer 122, and in S1008, the printer 122 transmits a request to the client computer 100 for the print data using the address information received from the cloud service 121. In S1009, the smart client 503 of the client computer 100 receives the request. The smart client 503 then contacts the central service 605 of the cloud service 121 with the identity of the printer 122 from which it received the request to print. In reply, the central service 605 of the cloud service 121 replies with a device information file (DIF file) for converting the PCL print data from the universal printer driver 502 stored in the queue 504 into a device specific print file suitable for printing by the printer 122. When the smart client 503 receives the DIF file the smart client 503 converts the PCL print data requested by the printer 122 into a device specific print language file for the printer 122. Then, the requested print data is transmitted from the client computer 100 to the printer 122 in step S1010. In S1011, printing is performed at the printer 122 based on the print data received from the client computer 100.

<Modification>

The above described embodiment describes a situation in which the printer 112 in the HQ office receives UI information from the UI server 602 of the print server 111. When print jobs are to be selected, the print jobs stored in the queue 603 on the print server 111 associated with the user logged in to the printer 112 are displayed for selection on the printer 112. The printer 122 in the branch office, in contrast, receives a list of print jobs from the cloud service 121 associated with the user logged in to the printer 122. Print data corresponding to these print jobs are stored on the user's client computer 100 until they are released to the printer 122 for printing.

In the modification, the user may use more than one client computer. In this case, if the user is in the HQ office, jobs from each client computer used by the user in the HQ office are sent to the queue 603 on the print server 111. The list of jobs may be retrieved by the printer 112 as described in the previous paragraph. When printing from more than one client computer in the branch office, each client computer used by the user to print in the branch office sends attribute information to the cloud service 121. The printer can display jobs who's attribute information is stored in the cloud service 121 for selection by the user at printer 122. However, when the print jobs are selected for printing, the cloud service 121 will include different storage locations for different print jobs depending on which client computer they were printed from, because the print jobs are stored locally in queues on the client computers that they were printed from. Accordingly, the printer 122 needs to transmit separate requests in S1008 to each client computer to retrieve the print data. Each client computer also needs to separately respond to the request by requesting the DIF file for printer 122 and converting the print data in S1009 before transmitting the converted print data to the printer 122.

In a further situation, if a user prints some print data in the branch office and prints some print data in the HQ office, some print data may be stored on the client computer 100 and some print data may be stored on the queue 603 of the print server 111. There are several different ways of managing this situation. In a first case, the application 702 on the printer 112 of the HQ office may be provided with a function to switch between UI servers of the print server 111 and the cloud service 121. This allows the user to separately view either his or her print jobs that are stored on the print server 111 or those print jobs who's attribute information is stored in the cloud service 121. This first approach has some limitations. The user when in the HQ office can print data stored on the print server 111 and any data that are stored locally on client computers that are located on the HQ office internal network 110. It is not possible to print data that are on client computers that are still located in the Branch Office internal network 120. Further, if the user is visiting the branch office, the user can only print data that are stored on client computers in the branch office internal network 120 because print data stored on the print server 111 and on client computers that are on the HQ office internal network 110 are not accessible via the BO internal network 120.

A second more flexible approach may be adopted. In the second approach, the synchronization illustrated in FIG. 6 is modified to include synchronization of print job information between the cloud service 121 and the print server 111. This synchronization includes attribute information of the print data (e.g. print job name, number of pages, etc.) but does not include the print data itself (i.e. the PCL print job data or print data in another print language). The synchronization also includes information about the storage location of the print data i.e. whether the print data is stored in the queue 603 on the print server 111 or is stored on the client computer 100 and the identification information and/or location of that client computer 100. When printing from printer 112 on the HQ office internal network, the user can view all his or her print jobs regardless of where they are printed because the attribute information is synchronized between the cloud service 121 and the print server 111. The user may print any print data stored on the print server 111 or any print data stored on a client computer that is on the HQ office internal network 110 (such as a client computer that the user instructed the printing at the branch office and then brought back to the HQ office internal network 110). When in the branch office, the user may print any print data stored on a client computer 100 on the branch office internal network 120. Further, for data stored on the print server 111 connected to the HQ office internal network 110, the user may request the print data for printing. In this case, the cloud service 121 requests the print data from the print server 111 and the print data including the PCL print data may be transferred to the printer 122 via the cloud service 121. This process is typically slower than file transfers across the BO internal network 120, which is why the print data is transferred on request from a user and the print data (PCL data or the like) is not synchronized between the print server 111 and the cloud service 121 by default.

FURTHER EMBODIMENTS

As described above, in connection with FIG. 8, configuration information is received by the smart client 503 which configures the behavior of the client computer to perform relevant steps described above in connection with FIGS. 9 and 10. However, these are not the only print workflows that could be configured to the smart client 503. In a further embodiment, the steps of FIG. 10 are modified such that the smart client is configured to cause the print job to be sent to the printer 122 for storage rather than being stored in the queue 504 of the client computer in step S1002. In this case, when the user logs in to the printer, the printer retrieves the job list from the cloud service 121 in steps S1005 and S1006. However, for print jobs stored on the printer, there is no need to request the print data from the client 100. The printer performs the steps of retrieving the DIF file from the cloud service 121 and converting the print data to printer specific print data for printing at the printer 122.

A further example of a workflow that can be configured into the smart client in response to the request for configuration information in S802 of FIG. 8 is that the print job is sent to the cloud service for storage. In this example, the workflow in FIG. 10 is modified so that the print data is sent by the client computer to the cloud service for storage in step S1002 instead of being stored locally on the client computer 100. In step 1008 the request for print data is sent from the printer to the cloud service, which is storing the print job including the print job data, instead of the client computer 100. Further, the conversion of the print job data using DIF files into printer-specific print data is performed directly on the cloud service before the printer-specific print data is sent to the printer for printing.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like.

The invention claimed is:

1. A printing system for printing from a client computer at each of a first physical location and a second physical location, the system comprising:
   the client computer;
   a print server provided within an internal network of the first location;
   a cloud service configured to be accessed via the internet at each of the first and second locations;
   a first printer provided on the internal network of the first location;
   a second printer provided on an internal network of the second location;
   wherein the client computer comprises:
   identification means configured to identify whether the client computer is connected to the internal network at the first location or connected to the internal network at the second location;
   connection means configured to request configuration information that determines a workflow of the client computer from the cloud service, the request including location information identified by the identification means; and
   reception means configured to receive the configuration information from the cloud service,
   wherein the configuration information configures the client computer to perform:
   in a case where the identification means identifies that the client computer is connected to the internal network at the first location, a workflow to send print data to the print server for printing; and in a case where the identification means identifies that the client computer is on the internal network at the second location, a workflow from one of:

storing the print data locally on the client computer for subsequent retrieval by the first or second printer for printing, sending the print data from the client computer to the second printer for storage at the second printer and subsequent printing, and sending the print data from the client computer to the cloud service for subsequent retrieval by the first or second printer for printing.

2. The printing system according to claim 1, wherein each of the print server and cloud service include a user authentication function and a connection is configured between the print server and the cloud service, wherein information about registered users is synchronized between the authentication function of the print server and the authentication function of the cloud service over the connection so that at least one registered user can access functions of the print server when printing at the first location and functions of the cloud service when printing at the second location.

3. The printing system according to claim 2, wherein in a case where the identification means identifies that the client computer is on the internal network at the second location, the received configuration information configures the client computer to send metadata about the print job to the cloud service to register the print job on the cloud service.

4. The printing system according to claim 3, wherein the print server and cloud service are configured to share metadata about print jobs stored on the cloud service and print jobs stored on the print server, the cloud service being configured to provide, upon request from the second printer, a list of print jobs that includes print jobs associated with a user logged in to the second printer that have metadata stored on the cloud service and print jobs associated with the user logged in to the second printer that are stored on the print server.

5. The printing system according to claim 4, wherein in a case that a user selects a print job stored on the print server from the list of print jobs, the cloud service is configured to retrieve the selected print job from the print server and transmit the selected print job to the second printer for printing.

6. The printing system according to claim 1, wherein in a case where the identification means identifies that the client computer is on the internal network at the second location, the received configuration information configures the client computer to send metadata about the print job to the cloud service to register the print job on the cloud service.

7. The printing system according to claim 6, wherein the second printer is configured to retrieve from the cloud service a list of print jobs associated with a user that logs in to the second printer and to retrieve and print a print job selected by a user from the retrieved list from the client computer on which the print jobs is stored.

8. The printing system according to claim 1, wherein the first printer is operable, when a user logs in to the first printer, to retrieve a list of print jobs associated with the logged in user from the print server and operable to retrieve a list of print jobs associated with the logged in user from the cloud service.

9. The printing system according to claim 1, wherein the identification means is configured to identify whether the client computer is connected to the internal network at the first location or connected to the internal network at the second location by identifying routers that forward one or more packets sent from the client computer to a predetermined network destination.

10. A method of printing from a client computer at each of a first physical location and a second physical location using a printing system, the printing system comprising:

the client computer;

a print server provided within an internal network of the first location;

a cloud service configured to be accessed via the internet at each of the first and second locations;

a first printer provided on the internal network of the first location;

a second printer provided on an internal network of the second location;

wherein the method comprises:

the client computer identifying whether the client computer is connected to the internal network at the first location or connected to the internal network at the second location;

the client computer requesting configuration information that determines a workflow of the client computer from the cloud service, the request including location information identified by the identifying step; and receiving the configuration information from the cloud service, wherein the configuration information configures the client computer to perform:

in a case where the identification means identifies that the client computer is connected to the internal network at the first location, a workflow to send print data to the print server for printing, and in a case where the identification means identifies that the client computer is on the internal network at the second location, a workflow from one of:

storing the print data locally on the client computer for subsequent retrieval by the first or second printer for printing, sending the print data from the client computer to the second printer for storage at the second printer and subsequent printing, and sending the print data from the client computer to the cloud service for subsequent retrieval by the first or second printer for printing.

11. A non-transitory computer-readable storage medium storing a program that, when executed by a client computer, causes the client computer to perform a method according to claim 10.

* * * * *